US008244620B1

(12) United States Patent
Jones et al.

(10) Patent No.: US 8,244,620 B1
(45) Date of Patent: *Aug. 14, 2012

(54) METHODS, SYSTEMS AND SECURITIES FOR ASSURING A COMPANY AN OPPORTUNITY TO SELL STOCK AFTER A SPECIFIED TIME

(75) Inventors: Emerson P. Jones, Greenwich, CT (US); Karen Schoen, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,599

(22) Filed: Jul. 22, 2011

Related U.S. Application Data

(63) Continuation of application No. 12/843,115, filed on Jul. 26, 2010, now Pat. No. 8,010,436, which is a continuation of application No. 10/677,838, filed on Oct. 2, 2003, now Pat. No. 7,788,154.

(60) Provisional application No. 60/415,611, filed on Oct. 2, 2002.

(51) Int. Cl.
G06Q 40/00 (2012.01)
(52) U.S. Cl. .................................. 705/36 R
(58) Field of Classification Search .............. 705/36, 705/1.1
See application file for complete search history.

(56) References Cited

U.S. PATENT DOCUMENTS

| 5,704,045 | A | 12/1997 | King et al. | |
| 5,742,775 | A | 4/1998 | King | |
| 5,761,441 | A | 6/1998 | Bennett | |
| 5,802,499 | A * | 9/1998 | Sampson et al. | 705/35 |
| 5,970,479 | A | 10/1999 | Shepherd | |
| 6,018,721 | A * | 1/2000 | Aziz et al. | 705/36 R |
| 6,112,188 | A | 8/2000 | Hartnett | |
| 6,134,536 | A | 10/2000 | Shepherd | |
| 6,148,293 | A | 11/2000 | King | |
| 6,263,321 | B1 * | 7/2001 | Daughtery, III | 705/36 R |
| 6,278,981 | B1 | 8/2001 | Dembo et al. | |
| 6,321,212 | B1 | 11/2001 | Lange | |
| 6,381,585 | B1 | 4/2002 | Maples et al. | |
| 6,418,419 | B1 | 7/2002 | Nieboer et al. | |
| 6,484,152 | B1 | 11/2002 | Robinson | |
| 6,766,303 | B2 * | 7/2004 | Marshall | 705/36 R |
| 7,024,384 | B2 * | 4/2006 | Daughtery, III | 705/36 R |
| 7,139,730 | B1 * | 11/2006 | Shimko et al. | 705/35 |
| 7,236,955 | B2 * | 6/2007 | Sugahara | 705/37 |
| 7,451,109 | B2 * | 11/2008 | Seaman | 705/37 |
| 7,689,496 | B1 * | 3/2010 | Cobrinik et al. | 705/37 |
| 7,689,497 | B2 * | 3/2010 | May | 705/37 |
| 7,752,101 | B2 * | 7/2010 | Woodruff et al. | 705/35 |
| 7,788,154 | B1 * | 8/2010 | Jones et al. | 705/36 R |
| 7,805,347 | B1 * | 9/2010 | Jones et al. | 705/36 R |
| 7,865,417 | B2 * | 1/2011 | Seaman | 705/36 R |
| 8,010,436 | B1 * | 8/2011 | Jones et al. | 705/36 R |
| 2001/0037277 | A1 | 11/2001 | Willis et al. | |
| 2001/0049651 | A1 | 12/2001 | Selleck | |
| 2001/0056392 | A1 * | 12/2001 | Daughtery, III | 705/36 |
| 2002/0007329 | A1 * | 1/2002 | Alcaly et al. | 705/35 |
| 2002/0042770 | A1 | 4/2002 | Slyke et al. | |
| 2002/0052819 | A1 | 5/2002 | Burton | |
| 2002/0099640 | A1 | 7/2002 | Lange | |
| 2002/0103852 | A1 * | 8/2002 | Pushka | 705/35 |
| 2002/0133443 | A1 * | 9/2002 | Seaman | 705/36 |
| 2002/0133456 | A1 * | 9/2002 | Lancaster et al. | 705/37 |
| 2002/0138382 | A1 * | 9/2002 | Seaman | 705/36 |
| 2002/0138420 | A1 * | 9/2002 | Seaman | 705/39 |
| 2002/0147670 | A1 | 10/2002 | Lange | |
| 2002/0156719 | A1 | 10/2002 | Finebaum et al. | |
| 2003/0009406 | A1 | 1/2003 | Ross | |
| 2003/0028468 | A1 | 2/2003 | Wong et al. | |
| 2003/0083972 | A1 * | 5/2003 | Williams | 705/36 |
| 2003/0093354 | A1 * | 5/2003 | Marshall | 705/36 |
| 2003/0093375 | A1 | 5/2003 | Green et al. | |
| 2003/0113128 | A1 | 6/2003 | Matsuduki | |
| 2003/0126069 | A1 * | 7/2003 | Cha | 705/37 |
| 2003/0130941 | A1 * | 7/2003 | Birle et al. | 705/40 |
| 2003/0135436 | A1 * | 7/2003 | Birle et al. | 705/35 |
| 2003/0135446 | A1 * | 7/2003 | Birle et al. | 705/37 |
| 2003/0163400 | A1 | 8/2003 | Ross et al. | |
| 2003/0225656 | A1 * | 12/2003 | Aberman et al. | 705/36 |

(Continued)

OTHER PUBLICATIONS

"Starbucks stock helps Schultz buy Sonics", Seattle Times, Wash: Mar. 29, 2001. p. 1.*
Rubinger, L. Jeffrey, "IRS Starting to Challenge Popular Tax Deferral Technique", Florida Bar Journal, Jan. 2003, vol. LXXVII, No. 1, pp. 1-8.*
Rubinger, Jeffrey L, "Recent FSAs may provide guidance on taxation of popular hedging/monetization transaction", Journal of Taxation. New York: Aug. 2002, vol. 97, Iss. 2; p. 111, 10 pgs.*
"LaBrance & Co. Announces Shelf Registration of Shares", PR Newswire. New York: Jan 18, 2002. p. 1.*
Aquino, Norman P, "MB lets banks renew forward contracts without prior nod", BusinessWorld. Manila: Aug. 16, 2002. p. 1.*
Bernstein, Robert, S, "Are VPFCS, collars, and DECS still viable hedging and monetization strategies?", Corporate Taxation. New York, N.Y.: Mar./Apr. 2003. vol. 30, Iss. 2; p. 39, 5 pgs.*
Wendell, Paul, J, "Proposed FASB staff positions", SEC Accounting Report. Boston: Oct. 2003. vol. 29, iss. 11; p. 7.*

(Continued)

Primary Examiner — Ella Colbert
Assistant Examiner — Mohammad Z Shaikh
(74) Attorney, Agent, or Firm — Perkins Coie LLP

(57) ABSTRACT

Embodiments of the present invention relate to a method comprising: inputting data regarding the sale of a security consisting of: (i) a post-paid forward contract which obligates the second entity to purchase a fixed number of shares stock of the first entity; and (ii) debt; inputting data regarding the purchase, by the first entity from the second entity, of a pre-paid forward contract which obligates the second entity to deliver to the first entity a variable number of shares of stock in the first entity; inputting a then-current stock price associated with the stock of the first entity; calculating a number of shares underlying the pre-paid forward contract, based on a formula that is a function of a then-current stock price and a remaining maturity associated with the pre-paid forward contract; recording the data regarding the sale of the security; recording the data regarding the purchase, of the pre-paid forward contract; and recording the calculated number of shares.

1 Claim, No Drawings

U.S. PATENT DOCUMENTS

| | | | |
|---|---|---|---|
| 2003/0236738 | A1 | 12/2003 | Lange et al. |
| 2004/0006520 | A1 | 1/2004 | Birle, Jr. et al. |
| 2005/0021430 | A1* | 1/2005 | Cheliotis et al. ............... 705/35 |
| 2005/0119962 | A1* | 6/2005 | Bowen et al. .................. 705/37 |
| 2006/0020526 | A1* | 1/2006 | Viner ............................. 705/35 |

OTHER PUBLICATIONS

Arzac, Enrique, R.,"PERCS,DECS, and Other Mandatory Convertibles", Journal of Applied Corporate Finance, vol. 10, No. 1, Spring 1997 pp. 54-63.*

Wendell, J. Paul, "FASB issues statement No. 150", SEC Accounting Report. Boston: Jul. 2003. vol. 29, iss. 8; p. 1.*

"Swift Transportation Announces Forward 1.3 Million Shares by Moyes Children", Business Wire, May 15, 2001, pp. 1-2.*

Wendell, J. Paul, "FASB issues statement No. 150", SEC Accounting Report. Boston: Jul 2003. vol. 29, iss. 8; p. 1.*

Boyle, P. Phelim, & Turnbull, M. Stuart, "Pricing and Hedging Capped Options", The Journal of Futures Markets, Feb. 1989, vol. 9, No. 1. pp. 1-10.*

Business Editors, "Meritage Corp. Announces Forward Contract of 200,000 shares by Co-Ceo.", Business Wire. New York: Aug 31, 2001. pp. 1-2.*

Allen, Moonirah, "Forward Trading at Kuwait Stock Exchange", Middle East News Online, Durham: Jul. 2001, pp. 1-2.*

Business Editors, "Reebok Chairman Announces Stock Transactions", Business Wire. New York: Jun. 28, 2002, pp. 1-2.*

"Mandatory Convertible", Investopedia.com, undated.

"Gabelli to sell Mandatory Convertible Securities", Gabelli Asset Management Inc, Jan. 29, 2002.

"AMG Mandatory Convertible Securities Sale Yields $223 Million in Net Proceeds", AMG News, Jan. 10, 2002.

"Monis Convertibles Training", Comment of the Week, Aug. 2, 2002.

"A Note on Mandatory Convertible Securities", Brown Brothers Harriman, May 13, 2003.

"A.M. Best Assigns Senior Debt Rating to St. Paul's Equity Units", Business Wire, www.findarticles.com, Jul. 31, 2002.

H2064, Buchalter, May 6, 2003.

* cited by examiner

METHODS, SYSTEMS AND SECURITIES FOR ASSURING A COMPANY AN OPPORTUNITY TO SELL STOCK AFTER A SPECIFIED TIME

CROSS-REFERENCE TO RELATED APPLICATIONS

This application is a continuation of and claims priority under 35 U.S.C. §120 to U.S. patent application Ser. No. 12/843,115, filed on Jul. 26, 2010, and entitled "METHODS, SYSTEMS, AND SECURITIES FOR ASSURING A COMPANY AN OPPORTUNITY TO SELL STOCK AFTER A SPECIFIED TIME," which in turn claims priority under 35 U.S.C. §120 to U.S. patent application Ser. No. 10/677,838, filed on Oct. 2, 2002 and entitled "METHODS, SYSTEMS, AND SECURITIES FOR ASSURING A COMPANY AN OPPORTUNITY TO SELL STOCK AFTER A SPECIFIED TIME," which in turn claims the benefit under 35 U.S.C. 119(e) of U.S. Provisional Application Ser. No. 60/415,611, filed Oct. 2, 2002.

FIELD OF THE INVENTION

Various embodiments of the present invention relate to methods, systems and securities for assuring a company an opportunity to sell stock (e.g., common stock) after a specified time.

More particularly, one embodiment of the present invention relates to a method implemented by a programmed computer system for use in connection with the sale of stock by a first entity, which method comprises the steps of: inputting data regarding the sale, by the first entity to a second entity, of a security consisting of: (i) a post-paid forward contract which obligates the second entity to purchase a fixed number of shares stock of the first entity; and (ii) debt; inputting data regarding the purchase, by the first entity from the second entity, of a pre-paid forward contract which obligates the second entity to deliver to the first entity a variable number of shares of stock in the first entity; inputting a then-current stock price associated with the stock of the first entity; calculating a number of shares underlying the pre-paid forward contract, based on a formula that is a function of a then-current stock price and a remaining maturity associated with the pre-paid forward contract; recording the data regarding the sale, by the first entity to the second entity, of the security consisting of: (i) the post-paid forward contract; and (ii) the debt; recording the data regarding the purchase, by the first entity from the second entity, of the pre-paid forward contract; and recording the calculated number of shares underlying the pre-paid forward contract.

Another embodiment of the present invention relates to a security, comprising: (a) a post-paid forward contract between a first entity and a second entity, which post-paid forward contract obligates the second entity to purchase a fixed number of shares stock of the first entity; (b) debt of the first entity; and (c) a pre-paid forward contract between the first entity and the second entity, which pre-paid forward contract obligates the second entity to deliver to the first entity a variable number of shares of stock in the first entity.

For the purposes of the present application the term "entity" is intended to refer to any person, organization, or group.

Further, for the purposes of the present application the term "security" is intended to refer to an instrument evidencing debt and/or ownership of asset(s).

Further still, for the purposes of the present application the term "delivery" is intended to refer to physical delivery of an instrument evidencing debt and/or ownership of asset(s) and/or delivery of equivalent value.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

One embodiment of the present invention relates to a method implemented by a programmed computer system for use in connection with the sale of stock by a first entity, which method comprises the steps of: inputting data regarding the sale, by the first entity to a second entity, of a security consisting of: (i) a post-paid forward contract which obligates the second entity to purchase a fixed number of shares stock of the first entity; and (ii) debt; inputting data regarding the purchase, by the first entity from the second entity, of a pre-paid forward contract which obligates the second entity to deliver to the first entity a variable number of shares of stock in the first entity; inputting a then-current stock price associated with the stock of the first entity; calculating a number of shares underlying the pre-paid forward contract, based on a formula that is a function of a then-current stock price and a remaining maturity associated with the pre-paid forward contract; recording the data regarding the sale, by the first entity to the second entity, of the security consisting of: (i) the post-paid forward contract; and (ii) the debt; recording the data regarding the purchase, by the first entity from the second entity, of the pre-paid forward contract; and recording the calculated number of shares underlying the pre-paid forward contract.

Another embodiment of the present invention relates to a security, comprising: (a) a post-paid forward contract between a first entity and a second entity, which post-paid forward contract obligates the second entity to purchase a fixed number of shares stock of the first entity; (b) debt of the first entity; and (c) a pre-paid forward contract between the first entity and the second entity, which pre-paid forward contract obligates the second entity to deliver to the first entity a variable number of shares of stock in the first entity.

In one example, the stock of the first entity may be common stock in a public company.

In another example, the post-paid forward contract may obligate the first entity to sell and the second entity to purchase, at maturity of the post-paid forward contract, a fixed number of shares of stock in the first entity for a fixed price.

In another example, the fixed price may essentially equal a face amount of the debt.

In another example, the first entity may pay, to the second entity, a contract fee on the post-paid forward contract.

In another example, the contract fee may be paid once.

In another example, the contract fee may be paid periodically at a time selected from the group including (but not limited to): (a) daily; (b) weekly; (c) monthly; (d) quarterly; (e) semi-annually; and (f) annually.

In another example, the debt may be initially pledged as collateral to secure the obligations of the second entity under the post-paid forward contract.

In another example, the second entity may have the right to recollateralize the post-paid forward contract.'

In another example, the debt may pay a fixed cash coupon, subject to reset.

In another example, the coupon may be paid periodically at a time selected from the group including (but not limited to): (a) daily; (b) weekly; (c) monthly; (d) quarterly; (e) semi-annually; and (f) annually.

In another example, the coupon may be reset and the debt may be remarketed.

In another example, the pre-paid forward contract may obligate the second entity to deliver to the first entity a variable number of shares of stock in the first entity depending on a price of the stock at maturity of the pre-paid forward contract.

In another example, the first entity may pre-pay the purchase price of the stock and may need not pay for the stock at the time of delivery.

In another example, at least a portion of the purchase price of the stock may be paid to the second entity at the time of issuance of the pre-paid forward contract with the remaining portion funded through periodic contract payments.

In another example, the contract payments may be paid periodically at a time selected from the group including (but not limited to): (a) daily; (b) weekly; (c) monthly; (d) quarterly; (e) semi-annually; and (f) annually.

In another example, prior to maturity of the pre-paid forward contract, the first entity may have the right to fix the number of shares underlying the pre-paid forward contract, based on a formula that is a function of a then-current stock price and a remaining maturity associated with the pre-paid forward contract.

In another example, the post-paid forward contract and the debt may be initially pledged as collateral to secure the obligations of the second entity to deliver stock pursuant to the pre-paid forward contract.

In another example, the second entity may have the right to recollateralize the pre-paid forward contract with common stock of the first entity.

An overview of one embodiment of the present invention will now be described. Of note, this embodiment of the present invention may hereinafter sometimes be referred to as a PACES structure (or security). In any case, such a PACES structure may have the following characteristics (the specific dates, time periods, interest rates and the like are, of course, provided simply as examples which are intended to be illustrative and not restrictive):

Summary Description
    Security which assures Company opportunity to sell stock (e.g., common stock) at the end of a certain time period (e.g., three years)
    Company sells PACES security consisting of: (i) a 3-year (or, in another example, 5-year) post-paid forward contract to purchase a fixed number of shares of Company common stock (the "Fixed-Share Forward Contract"); and (ii) 5-year (or, in another example, 7-year) debt (the "Resettable Remarketable Debt" or the "Debt") to investors Fixed-Share Forward Contract
    Maturity is 3 years (or, in another example, 5 years)
    Obligates Company to sell and investor(s) to purchase at maturity a fixed number of shares of Company common stock for a fixed price
    Purchase price may equal face amount of Debt
    Depending on terms, Company may pay contract fees (e.g., quarterly) to investor(s) on the Fixed-Share Forward Contract
    Debt may initially be pledged as collateral to secure investors' obligations under the Fixed-Share Forward Contract
    Investor(s) may have the right to recollateralize the Fixed-Share Forward Contract with Treasury Securities Resettable Remarketable Debt
    Maturity is five years (or, in another example, could be seven years if the Fixed-Share Forward is structured to have maturity of 5 years)
    Debt may pay a cash coupon (e.g., fixed, quarterly) subject to reset at end of 2¾ years (or, in another example, 4¾ years)
    After 2¾ years (or, in another example, 4¾ years), interest rate may be reset and Debt may be remarketed to new investor(s) for at least a certain percentage (e.g. 100.5%) of purchase price of portfolio of Treasury Securities which defeases the purchase price under the Fixed-Share Forward and the remaining payment (e.g., quarterly payment) on the Debt through the maturity of the Fixed-Share Forward Contract (assuming the interest rate on the Debt is not reset)

Treasury/Agency Collateralized PACES
    Variation in which PACES security consists of Treasury Securities (or, in another example, US Government Agency Securities) in lieu of Resettable Remarketable Debt
    Treasury Securities (or Agency Securities) may have a face amount at maturity of the Fixed-Share Forward Contract equal to the Fixed-Share Forward Contract purchase price
    Holders of PACES may receive yield on Treasury Securities (or Agency Securities), in addition to Contract Fees, if any, that Company pays on Fixed-Share Forward Referring now to a specific example of the present invention, a PACES structure may have the following characteristics (the specific dates, time periods, interest rates and the like are, of course, provided simply as examples which are intended to be illustrative and not restrictive):

Issuer: Any desired entity (the "Company")

Securities
    Company issues PACES security initially consisting of:
        a 3-year (or, in another example, 5-year) post-paid forward contract to purchase a fixed number of shares (e.g., 1.000 shares) of Company common stock for cash (the "Fixed-Share Forward Contract"); and
        5-year (or, in another example, 7-year) debt (the "Resettable Remarketable Debt" or "Debt"). The Debt may initially be pledged as collateral to secure investors' purchase obligations under the Fixed-Share Forward Contract. (Alternatively, in lieu of Resettable Remarketable Debt, PACES security may contain Treasury Securities and/or US Government Agency Securities (see "Treasury/Agency-Collateralized PACES" below).)

Issue Price: Any desired amount (e.g., $25 per PACES when Company stock price=$25 [of note, the two values do not necessarily have to be equal]).

Fixed-Share Forward Contract
    Irrevocable contract between Company and investor(s) specifying the future sale by Company of a fixed number of shares of its common stock (e.g., 1.000 shares) in exchange for a fixed dollar amount (the "Fixed-Share Forward Contract Price") in 3 years (or, in another example, 5 years). The Fixed-Share Forward Contract Price may equal the principal amount of the Debt and may be payable only in cash (i.e., investor(s) may be required to use cash to settle the Fixed-Share Forward Contract).

Investor(s) may settle the Fixed-Share Forward prior to maturity.

The Fixed-Share Forward Contract may automatically terminate in the event of Company bankruptcy. If, in the event of a failed remarketing, Company fails to pay put proceeds to investor(s) who exercise their put rights on the Resettable Remarketable Debt (see below), the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.

Contract Fees on Fixed-Share Forward: Company may pay contract fees (e.g., quarterly) on the Fixed-Share Forward Contract at any desired annual rate (Depending on the terms of particular PACES issuance, Company may not be required to pay contract fees on the Fixed-Share Forward Contract).

Resettable Remarketable Debt

The Resettable Remarketable Debt may be issued by Company with any desired principal amount (e.g., $25) and may have a maturity of 5 years (or, in another example, 7 years). Company may make interest payments (e.g., on a quarterly basis) at any desired annual rate on the principal amount. After year 2% (or, in another example, year 4%), the interest rate on the Debt may be reset and the Debt may be remarketed (see "Mechanics of Reset and Remarketing" below).

In the event of a failed remarketing, the Debt may be puttable by investor(s) at face value.

Mechanics of Reset and Remarketing: At year 2% (or, in another example, year 4%), each holder of the Debt (whether the Debt is held separately or as part of the PACES security) may determine whether it intends to participate in the remarketing. If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the Fixed-Share Forward Contract settlement date sufficient to fund: (i) the Fixed-Share Forward Contract Price; (ii) the interest payment (e.g., quarterly interest payment) on the Debt such holder(s) would otherwise be entitled to if the Debt were not reset and remarketed; and (iii) any accrued and unpaid interest on the Debt. Holder(s) who elect not to participate in the remarketing may be required to deliver specified U.S. Treasury Securities to the Forward Contract Agent on the designated date prior to the remarketing.

Transferability of the Debt: Subject to the requirement to post substitute collateral (see "Substitution of Pledged Securities" below), the Debt may be freely transferable.

Substitution of Pledged Securities: The Debt may initially be pledged as collateral to secure investors' obligations under the Fixed-Share Forward Contract. However, each holder may have the right prior to the remarketing of the Debt to substitute for the Debt held by the collateral agent Treasury Securities maturing on the maturity date of the Fixed-Share Forward Contract and with a face amount equal the principal amount of the Debt. Upon the substitution of such collateral, the Debt may be released to the holder, creating "Stripped PACES."

Listing of Stripped Units: If Stripped PACES and Debt are separately traded to a sufficient extent that applicable exchange listing requirements are met, Company may endeavor to cause such securities to be listed on the exchange on which the PACES are then listed.

Recreating PACES: Prior to the remarketing, a holder of Stripped PACES may have the right to subsequently recreate PACES by delivering Stripped PACES and the corresponding amount of Debt to the collateral agent in exchange for PACES and the release of the Treasury Securities previously pledged as collateral.

Bankruptcy or Default:

In case of bankruptcy prior to maturity, the Fixed-Share Forward Contract may automatically terminate. If, in the event of a failed remarketing, investor(s) exercise the put right on the Debt but Company fails to satisfy its obligations under that put, the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.

Treasury/Agency-Collateralized PACES

In lieu of Resettable Remarketable Debt, PACES may instead contain Treasury Securities (or, in another example, US Government Agency Securities) with a face amount at maturity of the Fixed-Share Forward Contract equal to the Fixed-Share Forward Contract Price.

Holder(s) of PACES may receive the yield on the Treasury Securities (or US Government Agency Securities) in addition to contract fees, if any, that Company pays on the Fixed-Share Forward Contract.

An overview of another embodiment of the present invention will now be described. Of note, this embodiment of the present invention may hereinafter sometimes be referred to as a SPACES structure (or security). In any case, such a SPACES structure may have the following characteristics (the specific dates, time periods, interest rates and the like are, of course, provided simply as examples which are intended to be illustrative and not restrictive):

Summary Description

Security which assures Company opportunity to sell stock (e.g., common stock) at the end of a certain time period (e.g., three years)

At inception, Company does the following (may be essentially simultaneously):

Sells PACES consisting of: (i) a 2¾-year (see note 1, below) post-paid forward contract to purchase a fixed number of shares of Company common stock (the "Fixed-Share Forward Contract") and (ii) 5-year (see note 1, below) debt (the "Resettable Remarketable Debt" or the "Debt") to investor(s)

Purchases from the same investor(s) a 3-year (see note 1, below) pre-paid forward contract to acquire a variable number of shares of Company common stock (the "Variable-Share Forward Contract")

Fixed-Share Forward Contract
  Maturity is 2¾ years (see note 1, below)
  Obligates Company to sell and investor(s) to purchase at maturity a fixed number of shares of Company common stock for a fixed price
  Purchase price may equal face amount of Debt
  Depending on terms, Company may pay contract fees (e.g., quarterly) to investor(s) on the Fixed-Share Forward Contract
  Debt may initially be pledged as collateral to secure investors' obligations under the Fixed-Share Forward Contract
    Investor(s) may have the right to recollateralize Fixed-Share Forward Contract with Treasury Securities
Variable-Share Forward Contract
  Maturity is three years (see note 1, below)
  Obligates investor(s) to deliver to Company a variable number of shares depending on stock price at maturity
    Company may pre-pay purchase price and may need not pay for such stock at time of delivery
    Portion of purchase price may be paid to investor(s) at time of SPACES issuance; remaining portion may be funded through contract payments (e.g., quarterly)
  Prior to maturity, Company may have the right to fix the number of shares underlying the Variable-Share Forward Contract, based on a pre-specified formula that is a function of then-current stock price and remaining maturity
  Specified amount of PACES may be initially pledged as collateral to secure investors' obligations to deliver stock pursuant to the Variable-Share Forward
    Investor(s) may have right to recollateralize Variable-Share Forward with Company common stock (number of shares which must be pledged may equal maximum number of shares deliverable under that contract)
Resettable Remarketable Debt
  Maturity is five years (see note 1, below)
  Debt may pay fixed (see note 2, below) coupon (e.g., quarterly cash coupon), subject to reset at end of 2½ years (see note 3, below)
  After 2½ years (see note 3, below), interest rate may be reset and Debt may be remarketed to new investor(s) for at least a certain percentage (e.g., 100.5%) of purchase price of portfolio of Treasury Securities which defeases the purchase price under the Fixed-Share Forward and the remaining payment (e.g., quarterly) on the Debt through the maturity of the Fixed-Share Forward Contract (assuming the interest rate on the Debt is not reset)
Treasury/Agency Collateralized SPACES
  Variation on SPACES in which PACES consist of Treasury Securities (or, in another example, US Government Agency Securities) in lieu of Resettable Remarketable Debt
    Treasury Securities (or Agency Securities) may have a face amount at maturity of Fixed-Share Forward Contract equal to Fixed-Share Forward Contract purchase price
    Holder(s) of PACES may receive yield on Treasury Securities (or Agency Securities) in addition to contract payments, if any, that Company makes on Fixed-Share Forward Referring now to a specific example of the present invention, a SPACES structure may have the following characteristics (the specific dates, time periods, interest rates and the like are, of course, provided simply as examples which are intended to be illustrative and not restrictive):

Issuer: Any desired entity (the "Company")
Securities
  The issuance of SPACES contemplates:
    (a) The sale to investor(s) of PACES initially consisting of:
      a 2¾-year (see note 1, below) post-paid forward contract to purchase a fixed number of shares (e.g., 1.000 share) of Company common stock for cash (the "Fixed-Share Forward Contract"); and
      5-year (see note 1, below) debt (the "Resettable Remarketable Debt" or "Debt"). The Debt may initially be pledged as collateral to secure investors' purchase obligations under the Fixed-Share Forward Contract. (Alternatively, in lieu of Resettable Remarketable Debt, PACES may contain Treasury Securities or US Government Agency Securities (see "Treasury/Agency-Collateralized SPACES" below).)
    (b) The purchase by Company from the same investor(s) of a 3-year (see note 1, below) pre-paid forward contract to acquire a variable number of shares of Company common stock (the "Variable-Share Forward Contract"). Company may pay a portion of the purchase price upfront; the remainder may be paid to investor(s) through contract fees (e.g., quarterly). A specified portion of the PACES may initially be pledged as collateral to secure investors' obligations to deliver common stock to Company under the Variable-Share Forward Contract
Issue Price: Any desired amount (e.g., $25 per SPACES when Company stock price=$25="Reference Price" [of note, the SPACES price and the Company Stock Price/Reference Price do not necessarily have to be equal]). The SPACES issue price may be the issue price of the PACES (a certain amount for the Fixed-Share Forward Contract plus a certain amount for the Debt), less an upfront price paid by Company for the Variable-Share Forward Contract.
Fixed-Share Forward Contract
  Irrevocable contract between Company and investor(s) specifying the future sale by Company of a fixed number of shares (e.g., 1.000 share (see note 4, below)) of its common stock in exchange for a fixed dollar amount (the "Fixed-Share Forward Contract Price") in 2¾ years (see note 1, below). The Fixed-Share Forward Contract Price may equal the principal amount of the Debt and may be payable only in cash (i.e., investor(s) may need to use cash to settle the Fixed-Share Forward Contract).
  Subject to the requirement to post substitute collateral for the Variable-Share Forward Contract, investor(s) may settle the Fixed-Share Forward prior to maturity.
  The Fixed-Share Forward Contract may automatically terminate in the event of Company bankruptcy. If, in the event of a failed remarketing, Company fails to pay put proceeds to investor(s) who exercise their put rights on the Resettable Remarketable Debt (see below), the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.

Contract Fees on Fixed-Share Forward: Company may pay contract fees (e.g., quarterly) on the Fixed-Share Forward Contract at any desired annual rate (Depending on terms of particular SPACES issuance, Company may not be required to pay contract fees on the Fixed-Share Forward Contract). Company may have the right to defer payment of contract fees on the Fixed-Share Forward Contract until maturity of that contract.

Resettable Remarketable Debt

The Resettable Remarketable Debt may be issued by Company with any desired principal amount (e.g., $25) and may have a maturity of 5 years. Company may make interest payments (e.g., on a quarterly basis) at any desired annual rate on the principal amount (see note 5, below). After year 2½, the interest rate on the Debt may be reset and the Debt may be remarketed (see "Mechanics of Reset and Remarketing" below) (see also note 6, below)

In the event of a failed remarketing, the Debt may be puttable by investors at face value.

Mechanics of Reset and Remarketing: At year 2½, each holder of the Debt (whether the Debt is held separately or as part of the PACES) may determine whether it intends to participate in the remarketing (see note 6, below) If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the Fixed-Share Forward Contract settlement date sufficient to fund: (i) the Fixed-Share Forward Contract Price; (ii) the interest payment (e.g., quarterly) on the Debt such holder(s) would otherwise be entitled to if the Debt were not reset and remarketed; and (iii) any accrued and unpaid interest on the Debt. Holder(s) who elect not to participate in the remarketing may be required to deliver specified U.S. Treasury Securities to the Forward Contract Agent on the designated date prior to the remarketing.

Transferability of the Debt: Subject to the requirement to post substitute collateral (see "Substitution of Pledged Securities" below), the Debt may be freely transferable.

Variable-Share Forward Contract

Pre-paid and irrevocable contract between Company and investor(s) specifying the future receipt by Company of a variable number of shares of its common stock in 3 years. The number of shares deliverable by investor(s) to Company (the "Settlement Rate") may be determined, for example, by the average trading price of the common stock over a 20-day period ending on the third date prior to the maturity date as summarized in Table 1, below:

TABLE 1

| Stock Price | # of Shares |
|---|---|
| [note that "Reference Price" may be stock price at issuance and "Threshold Price" may be a conversion price] | |
| Stock Price ≦ Reference Price | 0 shares |

TABLE 1-continued

| Stock Price | # of Shares |
|---|---|
| Reference Price < Stock Price < Threshold Price (e.g., $30 (see note 7, below)) | # of shares = (SPACES issue price / Reference Price) * [1-(Reference Price / Stock Price)] |
| Stock Price ≧ Threshold Price | # of shares = (SPACES issue price / Reference Price) * [1-(Reference Price / Threshold Price)] (e.g., 0.1667 shares) |

Prior to maturity, Company may, at its option, fix the Settlement Rate based on a pre-specified formula that is a function of: (i) the average trading price of the common stock over the 20-day period commencing on the day following Company's election; and (ii) the Variable-Share Forward Contract's remaining maturity.

The Variable-Share Forward Contract may automatically terminate in the event of Company bankruptcy or if, in the event of a failed remarketing, Company fails to pay put proceeds to investor(s) who exercise their put rights on the Resettable Remarketable Debt (see below).

Contract Fees on Variable-Share Forward: Company may pay contract fees (e.g., quarterly) on the Variable-Share Forward Contract at any desired annual rate. Company may have the right to defer payment of contract fees on the Variable-Share Forward Contract until maturity of that contract.

Right to Defer Contract Fees: Company may have the option (e.g., upon prior written notice to investor(s)) to defer the payment of any contract fees on the Fixed-Share Forward Contract and the Variable-Share Forward Contract until the respective maturities of those contracts. Deferred contract fees may bear additional contract fees at any desired rate per year. If the Fixed-Share Forward Contract or Variable-Share Forward Contract is terminated prior to its maturity (for example, in the case of bankruptcy prior to maturity), investors' right to receive contract fees and any deferred contract fees may also terminate. If Company elects to defer the payment of Contract Fees until maturity of the Fixed-Share Forward Contract or Variable-Share Forward Contract, as the case may be, in lieu of cash, investor(s) may receive Company common stock worth the amount of deferred contract fees, based on the then stock price; provided, however, that Company may not be required to deliver to investor(s) more than a certain number of shares of common stock as payment of the deferred contract fees.

Substitution of Pledged Securities

The Debt may initially be pledged as collateral to secure investors' obligations under the Fixed-Share Forward Contract. However, each holder may have the right prior to the remarketing of the Debt to substitute for the Debt held by the collateral agent Treasury Securities maturing on the maturity date of the Fixed-Share Forward Contract and with a face amount equal to the principal amount of the Debt. Upon the substitution of such collateral, the Debt may be released to the holder, creating "Stripped PACES."

A specified portion of the PACES (e.g., 0.1667 PACES) may initially be pledged as collateral to secure investors' obligations to deliver stock under the Variable-Share Forward Contract. Upon settlement of the Fixed-Share Forward Contract at year 2¾, the common stock issued with respect to the PACES pledged as collateral may be retained by the collateral agent to secure investors' obligations to deliver stock to Company at year 3. However, each holder may have the right to substitute for the PACES (or, in another example, Stripped PACES) held by the collateral agent the same number of shares of Company common stock. (The number of shares which must be pledged as collateral may equal the maximum number of shares deliverable under the Variable-Share Forward Contract.) Upon the substitution of such collateral, the PACES (or Stripped PACES) may be released to the holder, creating "Stripped Forwards."

Listing of Stripped PACES and Stripped Forwards: If PACES, Stripped PACES, Debt, or Stripped Forwards are separately traded to a sufficient extent that applicable exchange listing requirements are met, Company may endeavor to cause such securities to be listed on the exchange on which the SPACES are then listed.

Recreating PACES and the Variable-Share Forward
  Prior to the remarketing, a holder of Stripped PACES may have the right to subsequently recreate PACES by delivering Stripped PACES and the corresponding amount of Debt to the collateral agent in exchange for PACES and the release of the Treasury Securities previously pledged as collateral.
  A holder of Stripped Forwards may have the right to subsequently recreate Variable-Share Forward Contracts by delivering Stripped Forwards and the requisite amount of PACES in exchange for Variable-Share Forwards and the release of the common stock previously pledged as collateral.

Bankruptcy or Default: In case of bankruptcy prior to maturity, both the Fixed-Share Forward Contract and the Variable-Share Forward Contract may automatically terminate. If, in the event of a failed remarketing, investor(s) exercise the put right on the Debt but Company fails to satisfy its obligations under that put, the Variable-Share Forward Contract may terminate. In that case, the maturity of the Fixed-Share Forward Contract may be extended to the Extension Date, which (in one example) may be six days after the original maturity date. Investor(s) may elect to settle the Fixed-Share Forward Contract prior to the Extension Date. If investor(s) have not settled the Fixed-Share Forward Contract prior to the Extension Date, the Fixed-Share Forward Contract may automatically terminate.

Treasury/Agency-Collateralized SPACES
  In lieu of Resettable Remarketable Debt, PACES may instead contain Treasury Securities (or, in another example, US Government Agency Securities) with a face amount at maturity of the Fixed-Share Forward Contract equal to the Fixed-Share Forward Contract Price.
  Holder(s) of PACES may receive the yield on the Treasury Securities (or US Government Agency Securities) in addition to contract fees, if any, that Company pays on the Fixed-Share Forward Contract.

Notes on the SPACES example described above:
  1) Maturity could be longer (or shorter), for example up to 4¾ years in the case of the Fixed-Share Forward Contract and 5 years in the case of the Variable-Share Forward Contract. If the maturities of the Fixed-Share Forward Contract and Variable-Share Forward Contract were extended, the maturity of the Debt would correspondingly be extended as well (e.g., the Debt maturity would be 7 years (for example) if the Fixed-Share Forward Contract was structured to have a maturity of 4¾ years).
  2) Alternatively, Debt may be floating-rate debt.
  3) Date of rate reset and remarketing may be adjusted if the Fixed-Share Forward Contract were structured to have a longer (or shorter) maturity.
  4) Number of shares underlying the Fixed-Share Forward Contract=SPACES Issue Price/Reference Price.
  5) Debt may be either fixed-rate or floating-rate debt.
  6) Date of rate reset and remarketing may be adjusted if the Fixed-Share Forward Contract (and the Debt) were structured to have a longer (or shorter) maturity.
  7) This example assumes Threshold Price is 20% above Reference Price, but premium of Threshold Price to Reference Price could be higher or lower.

An overview of another embodiment of the present invention will now be described. Of note, this embodiment of the present invention may hereinafter sometimes be referred to as a OUTER SPACES structure (or security). In any case, such a OUTER SPACES structure may have the following characteristics (the specific dates, time periods, interest rates and the like are, of course, provided simply as examples which are intended to be illustrative and not restrictive):

Summary Description
  Security which assures Company opportunity to sell stock (e.g., common stock) at the end of a certain time period (e.g., three years)
  Company issues OUTER SPACES consisting of:
    PACES consisting of: (i) a 2¾-year (see note 1, below) post-paid forward contract to purchase a fixed number of shares (e.g., 0.833 shares) of Company common stock (the "Fixed-Share Forward Contract") and (ii) 5-year (see note 1, below) debt (the "Resettable Remarketable Debt" or the "Debt") to investors
    a 3-year (see note 1, below) pre-paid forward contract to acquire a variable number of shares of Company common stock (the "Variable-Share Forward Contract")

Fixed-Share Forward Contract
  Maturity is 2¾ years (see note 1, below)
  Obligates Company to sell and investor(s) to purchase at maturity a fixed number of shares of Company common stock for a fixed price
  Purchase price may equal face amount of Debt
  Depending on terms, Company may pay contract fees (e.g., quarterly) to investor(s) on the Fixed-Share Forward Contract
  Debt may initially be pledged as collateral to secure investors' obligations under Fixed-Share Forward Contract
  Investor(s) may have the right to recollateralize Fixed-Share Forward Contract with Treasury Securities Resettable Remarketable Debt
  Maturity is five years (see note 1, below)
  Debt will pay fixed (see note 2, below) coupon (e.g., quarterly cash coupon), subject to reset at end of 2½ years (see note 3, below)
  After 2¾ years (see note 3, below), interest rate may be reset and Debt may be remarketed to new investor(s) for at least a certain percentage (e.g., 100.5%) of purchase price of portfolio of Treasury Securities which defeases the purchase price under the Fixed-Share Forward and the remaining payment (e.g., quarterly) on the Debt through the maturity of the Fixed-Share Forward Contract (assuming the interest rate on the Debt is not reset)

Variable-Share Forward Contract
  Maturity is three years
  Obligates Company to deliver to investor(s) a variable number of shares of its common stock
    Investor(s) may pre-pay purchase price and may not need not pay for such stock at time of delivery Treasury/Agency Collateralized OUTER SPACES
  Variation on OUTER SPACES in which PACES consist of Treasury Securities (or, in another example, US Government Agency Securities) in lieu of Resettable Remarketable Debt
    Treasury Securities (or Agency Securities) may have a face amount at maturity of Fixed-Share Forward Contract equal to Fixed-Share Forward Contract purchase price
    Holder(s) of PACES receive yield on Treasury Securities (or Agency Securities) in addition to contract payments, if any, that Company makes on Fixed-Share Forward Referring now to a specific example of the present invention, an OUTER SPACES structure may have the following characteristics (the specific dates, time periods, interest rates and the like are, of course, provided simply as examples which are intended to be illustrative and not restrictive):

Issuer: Any desired entity (the "Company")
Issue Price: Any desired amount (e.g., $25 per OUTER SPACES when Company stock price=$25="Reference Price" [of note, the OUTER SPACES price and the Company Stock Price/Reference Price do not necessarily have to be equal]).
Securities:
  SPACES consisting of:
    PACES initially consisting of:
      a 2¾-year (see note 1, below) post-paid forward contract to purchase a fixed number of shares (e.g., 0.8333 shares) of Company common stock for cash (the "Fixed-Share Forward Contract"); and
      5-year (see note 1, below) debt (the "Resettable Remarketable Debt" or "Debt"). The Debt initially may be pledged as collateral to secure investors' purchase obligations under the Fixed-Share Forward Contract. (Alternatively, in lieu of Resettable Remarketable Debt, PACES may contain Treasury Securities or US Government Agency Securities (see "Treasury/Agency-Collateralized OUTER SPACES" below).)
    a 3-year (see note 1, below) pre-paid forward contract to acquire a variable number of shares of Company common stock (the "Variable-Share Forward Contract").
Fixed-Share Forward Contract
  Irrevocable contract between Company and investor(s) specifying the future sale by Company of a fixed number of shares (e.g., 0.8333 shares (see note 4, below)) of its common stock in exchange for a fixed dollar amount (the "Fixed-Share Forward Contract Price") in 3 years. The Fixed-Share Forward Contract Price may equal the principal amount of the Debt and may be payable only in cash (i.e., investor(s) may need to use cash to settle the Fixed-Share Forward Contract).
  Investor(s) may settle the Fixed-Share Forward Contract prior to maturity.
  The Fixed-Share Forward Contract may automatically terminate in the event of Company bankruptcy. If, in the event of a failed remarketing, Company fails to pay put proceeds to investor(s) who exercise their put rights on the Resettable Remarketable Debt (see below), the maturity of the Fixed-Share Forward Contract may be extended to the Extension Date, which (in one example) may be six days after the original maturity date. Investor(s) may elect to settle the Fixed-Share Forward Contract (e.g., with cash) prior to the Extension Date. If investor(s) have not settled the Fixed-Share Forward Contract prior to the Extension Date, the Fixed-Share Forward Contract may automatically terminate.
Contract Fees on Fixed-Share Forward Contract: Company may pay contract fees (e.g., quarterly) on the Fixed-Share Forward Contract at any desired annual rate of the Fixed-Share Forward Contract Purchase Price. Company may have the right to defer payment of contract fees on the Fixed-Share Forward Contract until maturity of that contract.
Right to Defer Contract Fees: Company may have the option (e.g., upon prior written notice to investor(s)), to defer the payment of any contract fees on the Fixed-Share Forward Contract until maturity of that contracts. Deferred contract fees may bear additional contract fees at any desired rate per year. If the Fixed-Share Forward Contract is terminated prior to its maturity (for example, in the case of bankruptcy prior to maturity), investors' right to receive contract fees and any deferred contract fees may also terminate. If Company elects to defer the payment of Contract Fees until maturity of the Fixed-Share Forward Contract, in lieu of cash investor(s) may receive Company common stock worth the amount of deferred contract fees, based on the then stock price; provided, however, that Company may not necessarily be required to deliver to investor(s) more than a certain number shares of common stock as payment of the deferred contract fees.
Resettable Remarketable Debt
  The Resettable Remarketable Debt may be issued by Company with any desired principal amount (e.g., $25) and may have a maturity of 5 years. Company may make interest payments (e.g., on a quarterly basis) at any desired annual rate on the principal amount (see note 5, below). After year 2½, the interest rate on the Debt may be reset and the Debt may be remarketed (see "Mechanics of Reset and Remarketing" below) (see also note 6, below).
  In the event of a failed remarketing, the Debt may be puttable by investors at face value.
Mechanics of Reset and Remarketing: At year 2½, each holder of the Debt (whether the Debt is held separately or as part of the overall structure) may determine whether it intends to participate in the remarketing (see note 7, below). If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the Fixed-Share Forward Contract settlement date sufficient to fund: (i) the Fixed-Share Forward Contract Price; (ii) the payment (e.g., quarterly) on the Debt such holder(s) would otherwise be entitled to if the Debt were not reset and remarketed; and (iii) any accrued and unpaid interest on the Debt. Holder(s) who elect not to participate in the remarketing may be required to deliver specified U.S. Treasury Securities to the Forward Contract Agent on the designated date prior to the remarketing.

Transferability of the Debt: Subject to the requirement to post substitute collateral (see "Substitution of Pledged Securities" below), the Debt may be freely transferable.

Variable-Share Forward Contract

Pre-paid and irrevocable contract between Company and investor(s) specifying the future receipt by investor(s) of a variable number of shares of Company common stock in 3 years. The number of shares deliverable to investor(s) (the "Settlement Rate") may be determined (in one example) by the average trading price of the common stock over a 20-day period ending on the third date prior to the maturity date as summarized in Table 2, below:

TABLE 2

| Stock Price | # of Shares |
|---|---|
| Stock Price ≦ Reference Price | # of shares = (OUTER SPACES issue price /Reference Price) * [1-(Reference Price / Threshold Price] (e.g., 0.1667 shares) |
| Reference Price < Stock Price < Threshold Price (e.g., $30 (see note 8, below)) | # of shares = (OUTER SPACES issue price / Reference Price) * [(Reference Price / Stock Price)-(Reference Price / Threshold Price)] |
| Stock Price ≧ Threshold Price | 0 shares |

The Variable-Share Forward Contract may automatically terminate in the event of Company bankruptcy or if, in the event of a failed remarketing, Company fails to pay put proceeds to investor(s) who exercise their put rights on the Resettable Remarketable Debt (see below).

Substitution of Pledged Securities: The Debt may initially be pledged as collateral to secure investors' obligations under the Fixed-Share Forward Contract. However, each holder may have the right prior to the remarketing of the Debt to substitute for the Debt held by the collateral agent Treasury Securities maturing on the maturity date of the Fixed-Share Forward Contract and with a face amount equal to the principal amount of the Debt. Upon the substitution of such collateral, the Debt may be released to the holder, creating "Stripped PACES."

Listing of Stripped PACES: If Stripped PACES and the Debt are separately traded to a sufficient extent that applicable exchange listing requirements are met, Company may endeavor to cause such securities to be listed on the exchange on which the OUTER SPACES are then listed.

Recreating PACES: Prior to the remarketing, a holder of Stripped PACES may have the right to subsequently recreate PACES by delivering Stripped PACES and the corresponding amount of Debt to the collateral agent in exchange for PACES and the release of the Treasury Securities previously pledged as collateral.

Bankruptcy or Default: In case of bankruptcy prior to maturity, both the Fixed-Share Forward Contract and the Variable-Share Forward Contract may automatically terminate. If, in the event of a failed remarketing, investor(s) exercise the put right on the Debt but Company fails to satisfy its obligations under that put, the Variable-Share Forward Contract may terminate. In that case, the maturity of the Fixed-Share Forward Contract may be extended to the Extension Date, which (in one example) may be six days after the original maturity date.

qjInvestor(s) may elect to settle the Fixed-Share Forward Contract prior to the Extension Date. If investor(s) have not settled the Fixed-Share Forward Contract prior to the Extension Date, the Fixed-Share Forward Contract may automatically terminate.

Treasury/Agency-Collateralized OUTER SPACES

In lieu of Resettable Remarketable Debt, PACES may instead contain Treasury Securities (or, in another example, US Government Agency Securities) with a face amount at maturity of the Fixed-Share Forward Contract equal to the Fixed-Share Forward Contract Price.

Holder(s) of PACES may receive the yield on the Treasury Securities (or US Government Agency Securities) in addition to contract fees, if any, that Company pays on the Fixed-Share Forward Contract.

Notes on the OUTER SPACES example described above:
1) Maturity could be longer (or shorter), for example, up to 4¾ years in the case of the Fixed-Share Forward Contract and 5 years in the case of the Variable-Share Forward Contract. If the maturities of the Fixed-Share Forward Contract and Variable-Share Forward Contract were extended, for example, the maturity of the Debt would correspondingly be extended as well (e.g., the Debt maturity would, for example, be 7 years if the Fixed-Share Forward Contract was structured to have a maturity of 4% years).
2) Alternatively, Debt may be floating-rate debt.
3) Date of rate reset and remarketing may be adjusted if the Fixed-Share Forward Contract were structured to have a longer (or shorter) maturity.
4) Number of shares underlying Fixed-Share Forward Contract=SPACES Issue Price/Threshold Price.
5) Debt may be either fixed-rate or floating-rate debt.
6) Date of rate reset and remarketing may be adjusted if the Fixed-Share Forward Contract (and the Debt) were structured to have a longer (or shorter) maturity.
7) Date of rate reset and remarketing may be adjusted if the Fixed-Share Forward Contract (and the Debt) were structured to have a longer (or shorter) maturity.
8) This example assumes Threshold Price is 20% above Reference Price, but premium of Threshold Price to Reference Price could be higher or lower.

An overview of another embodiment of the present invention will now be described. Of note, this embodiment of the present invention may hereinafter sometimes be referred to as a FLAT SPACES structure (or security). In any case, such a FLAT SPACES structure may have the following characteristics (the specific dates, time periods, interest rates and the like are, of course, provided simply as examples which are intended to be illustrative and not restrictive):

Issuer: Any desired entity (the "Company")

Securities

The issuance of FLAT SPACES contemplates:
The sale to investor(s) of Units initially consisting of:
A certain number (e.g., 0.833) (see note 1, below) of net-share-settled warrants on Company common stock and with a 3-year (see note 2, below) maturity (the "Net-Share Settled Warrants");
a 3-year (see note 2, below) post-paid forward contract requiring investor(s) to purchase a variable number of shares of Company common stock if the stock price at maturity is above the stock price at issuance (the "Variable-Share Forward Contract")

5-year (see note 2, below) debt (the "Resettable Remarketable Debt" or "Debt"). The Debt may initially be pledged as collateral to secure investors' purchase obligations under both the Variable-Share Forward Contract and the Put Options (described below). (Alternatively, in lieu of Resettable Remarketable Debt, the Units may contain Treasury Securities or US Government Agency Securities (see "Treasury/Agency-Collateralized FLAT SPACES" below).)

The purchase by Company from the same investor(s) of a certain number (e.g., one) 3-year (see note 2, below) put option entitling Company to put one share of Company common stock to investor(s) at the strike price (the "Put Options") (see note 3, below). Company may pay a portion of the purchase price upfront; the remainder may be paid to investor(s) through contract fees (e.g., quarterly). The Debt may initially be pledged as collateral to secure investors' potential obligations under the Put Options.

Issue Price: Any desired amount (e.g., $$25 per FLAT SPACES when Company stock price=$25="Reference Price" [of note, the FLAT SPACES price and the Company Stock Price/Reference Price do not necessarily have to be equal]). The FLAT SPACES issue price may be the issue price of the Units (a certain amount for the Net-Share-Settled Warrants plus a certain amount for the Variable-Share Forward Contract plus a certain amount for the Debt), less an upfront price paid by Company for the Put Options.

Net-Share-Settled Warrants

Warrants giving investor(s) the right to acquire Company common stock for a fixed strike price (the "Warrant Strike Price") (e.g., $30) (see note 4, below). Warrants may need to be net-share settled; accordingly, upon exercise investor(s) may receive a variable number of shares based on the stock price at maturity. The number of shares investor(s) are entitled to receive may be determined, for example, by the average trading price of the common stock over a 20-day period ending on the third date prior to the maturity date as summarized by the following formula:

(FLAT SPACES Issue Price/Warrant Strike Price)*
(Stock Price−Warrant Strike Price)/Stock Price Variable-Share Forward Contract Post-paid and irrevocable contract between Company and investor(s) specifying the future sale by Company of a variable number of shares of its common stock in exchange for a fixed dollar amount (the "Variable-Share Forward Contract Price") in 3 years, for example, provided that the stock price is above the Reference Price (e.g., $25). The Variable-Share Forward Contract Price may equal the principal amount of the Debt and may be payable only in cash (i.e., investors may need to use cash to settle the Variable-Share Forward Contract). In exchange for cash in an amount equal to the Variable-Share Forward Contract Price, investor(s) may receive common stock worth the Variable-Share Forward Contract Price. The number of shares deliverable by Company to investor(s) (the "Settlement Rate") may be determined, for example, by the average trading price of the common stock over a 20-day period ending on the third date prior to the maturity date.

The Variable-Share Forward Contract may automatically terminate in the event of Company bankruptcy. If, in the event of a failed remarketing, Company fails to pay put proceeds to investors who exercise their put rights on the Resettable Remarketable Debt (see below), the maturity of the Variable-Share Forward Contract may be extended to the Extension Date, which (in one example) may be six days after the original maturity date. Investor(s) may elect to settle the Variable-Share Forward Contract prior to the Extension Date. If investor(s) have not settled the Variable-Share Forward Contract prior to the Extension Date, the Variable-Share Forward Contract may automatically terminate.

Resettable Remarketable Debt

The Resettable Remarketable Debt may be issued by Company with a principal amount, for example, of $25 and may have a maturity of 5 years. Company may make interest payments (e.g., on a quarterly basis) at any desired annual rate on the principal amount (see note 5, below). After year 2¾, the interest rate on the Debt may be reset and the Debt may be remarketed (see "Mechanics of Reset and Remarketing" below) (see also note 6, below).

In the event of a failed remarketing, the Debt may be puttable by investors at face value.

Mechanics of Reset and Remarketing

At year 2¾, each holder of the Debt (whether the Debt is held separately or as part of the overall structure) may determine whether it intends to participate in the remarketing. (see note 6, below) If holder(s) elect to participate in the remarketing, an independent Remarketing Agent may determine the appropriate Reset Rate and attempt to remarket the notes on behalf of such holder(s) for an amount equal to at least a certain percentage (e.g., 100.5%) of the Treasury Consideration, where the Treasury Consideration is the amount of Treasury Securities with a face amount at the maturity date of both the Variable-Share Forward Contract and the Put Options sufficient to fund: (i) either the Variable-Share Forward Contract Price or the Put Strike Price; (ii) the interest payment (e.g., quarterly) on the Debt such holder(s) would otherwise be entitled to if the Debt were not reset and remarketed; and (iii) any accrued and unpaid interest on the Debt.

Holder(s) who elect not to participate in the remarketing may be required to deliver specified U.S. Treasury Securities to the Collateral Agent on the designated date prior to the remarketing.

Transferability of the Debt: Subject to the requirement to post substitute collateral (see "Substitution of Pledged Securities" below), the Debt may be freely transferable.

Put Options

Each Put Option may give Company the right to put one share of its common stock for a fixed price (the "Put Strike Price") at year 3. The Put Strike Price may equal the Reference Price and may be payable only in cash. In connection with each FLAT SPACES, Company may purchase from investor(s) a certain number (e.g., one) (see note 3, below) of Put Option(s), so the aggregate strike price on puts associated with each FLAT SPACES will equal the principal amount of the Debt.

The Put Options may automatically terminate in the event of Company bankruptcy or if, in the event of a failed remarketing, Company fails to pay put proceeds to investor(s) who exercise their put rights on the Resettable Remarketable Debt (see below).

Contract Fees on Variable-Share Forward: Company may pay contract fees (e.g., quarterly) on the Put Options at any desired annual rate.

Substitution of Pledged Securities: The Debt may initially be pledged as collateral to secure investors' obligations under the Variable-Share Forward Contract and the Put Options. However, each holder may have the right prior to the remarketing of the Debt to substitute for the Debt held by the collateral agent Treasury Securities maturing on the maturity date of the Fixed-Share Forward Contract and with a face amount equal the principal amount of the Debt. The Debt (or Treasury Securities) may serve as collateral for both the Variable-Share Forward Contract and the Put Options. Each holder, however, may have the right to separate the Variable-Share Forward from the Put Options by posting additional collateral (either the Debt or Treasury Securities), so that there is separate collateral for each of the Variable-Share Forward Contract and the Put Options.

Bankruptcy or Default: In case of bankruptcy prior to maturity, both the Variable-Share Forward Contract and the Put Options may automatically terminate. If, in the event of a failed remarketing, investor(s) exercise the put right on the Debt but Company fails to satisfy its obligations under that put, the Put Options may terminate. In that case, the maturity of the Variable-Share Forward Contract may be extended to the Extension Date, which (in one example) may be six days after the original maturity date. Investor(s) may elect to settle the Variable-Share Forward Contract prior to the Extension Date. If investor(s) have not settled the Variable-Share Forward Contract prior to the Extension Date, the Variable-Share Forward Contract may automatically terminate.

Treasury/Agency-Collateralized SPACES

In lieu of Resettable Remarketable Debt, Units may instead contain Treasury Securities (or, in another example, US Government Agency Securities) with a face amount at maturity of the Variable-Share Forward Contract and Put Options equal to the Variable-Share Forward Contract Price or Put Strike Price (the Variable-Share Forward Contract Price will equal the Put Strike Price).

Holder(s) of Units may receive the yield on the Treasury Securities (or US Government Agency Securities) in addition to contract fees, if any, that Company pays on the Put Options.

Notes on the FLAT SPACES example described above:
1) The number of warrants included in each unit=FLAT SPACES Issue Price /Warrant Strike Price.
2) Maturity could be longer (or shorter), for example, up to 5 years for the Net-Share-Settled Warrant, the Variable-Share Forward Contract, and the Put. If the maturities of those instruments were extended, for example, the maturity of the Debt would correspondingly be extended as well (e.g., the maturity of the Debt would be, in one example, 7 years if the Variable-Share Forward Contract were structured to have a maturity of 5 years).
3) The number of put options purchased by Company per FLAT SPACES=FLAT SPACES Issue Price/Reference Price.
4) Warrant Strike Price shown in this example represents a premium of 20% above the Reference Price, but premium could be higher or lower.
5) Debt may be fixed-rate or floating-rate debt.
6) Date of reset and remarketing may be adjusted if the FLAT SPACES were structured to have a longer (or shorter) maturity (i.e., if the various components of FLAT SPACES each had a longer (or shorter) maturity).

An overview of another embodiment of the present invention will now be described. Of note, this embodiment of the present invention may hereinafter sometimes be referred to as a COMMON SPACES structure (or security). In any case, such a COMMON SPACES structure may have the following characteristics (the specific dates, time periods, interest rates and the like are, of course, provided simply as examples which are intended to be illustrative and not restrictive):

Summary Description
  Company does the following (may be carried out essentially simultaneously):
    Sells common stock to investor(s)
    Purchases from the same investors(s) a 3-year (or, in another example, 5-year) pre-paid forward contract to acquire a variable number of shares of Company common stock (the "Variable-Share Forward Contract")
    The two instruments above may be sold as a unit
  Variable-Share Forward Contract
    Maturity is three years (or, in another example, five years)
    Obligates investor(s) to deliver to Company a variable number of shares depending on stock price at maturity
    Company may pre-pay purchase price and may not need pay for such stock at time of delivery
    Purchase price may funded through contract payments (e.g., quarterly) by Company
    Prior to maturity, Company may have the right to fix the number of shares underlying the Variable-Share Forward Contract (e.g., based on a pre-specified formula that is a function of then-current stock price and remaining maturity)
    Specified amount of common stock may initially be pledged as collateral to secure investors' obligations to deliver stock pursuant to the Variable-Share Forward (number of shares of common stock which must be pledged may equal the maximum number of shares deliverable under that contract)

Referring now to a specific example of the present invention, a COMMON SPACES structure may have the following characteristics (the specific dates, time periods, interest rates and the like are, of course, provided simply as examples which are intended to be illustrative and not restrictive):

Issuer: Any desired entity (the "Company")
Securities
  The issuance of COMMON SPACES contemplates:
    The sale to investor(s) of common stock (e.g., 1 share); and
    The purchase by Company from the same investor(s) of a 3-year (or, in another example, 5-year) pre-paid forward contract to acquire a variable number of shares of Company common stock (the "Variable-Share Forward Contract"). Company may pay the purchase price to investor(s) through contract fees (e.g., quarterly). A specified amount of the common stock may be pledged as collateral to secure investors' obligations to deliver common stock to Company under the Variable-Share Forward Contract.

Issue Price: Any desired amount (e.g., $25 per COMMON SPACES when Company stock price=$25 [of note, the two values do not necessarily have to be equal]).

Variable-Share Forward Contract

Pre-paid and irrevocable contract between Company and investor(s) specifying the future receipt by Company of a variable number of shares of its common stock in 3 years. The number of shares deliverable by investors to Company (the "Settlement Rate") may be determined, for example, by the average trading price of the common stock over a 20-day period ending on the third date prior to the maturity date as summarized in the Table 3, below:

TABLE 3

| Stock Price | # of Shares |
|---|---|
| Stock Price ≤ $25 | 0 shares |
| $25 < Stock Price < $30 | # of shares given by formula: 1-($25/Stock Price) |
| Stock Price ≥ $30 | 0.1667 shares |

Prior to maturity, Company may, at its option, fix the Settlement Rate based on a pre-specified formula (e.g., which formula is a function of the average trading price of the common stock over the 20-day period ending on the third date prior to the Company's election and the Variable-Share Forward Contract's remaining maturity).

The Variable-Share Forward Contract may automatically terminate in the event of Company bankruptcy.

Contract Fees on Variable-Share Forward: Company may pay contract fees (e.g., quarterly) on the Variable-Share Forward Contract at any desired annual rate.

Bankruptcy or Default: In case of bankruptcy prior to maturity, the Variable-Share Forward Contract may automatically terminate.

An overview of another SPACES-type embodiment of the present invention will now be described. Such a SPACES structure may have the following characteristics (the specific dates, time periods, interest rates and the like are, of course, provided simply as examples which are intended to be illustrative and not restrictive):

Summary Description

Security structure which assures Issuer opportunity to sell stock (e.g., common stock) at the end of, for example, three years or before At inception, Issuer does the following (which may be done essentially simultaneously):

Purchases from investor(s) an option to put a capped variable number of shares of its common stock ("Recollaterizable Three-Year American Issuer Put")

Issues debt (or trust preferred) ("Resettable Remarketable Five-Year Debt") to same investor(s)

Sells a net-share-settled warrant on its common stock (Separable Net-Share-Settled Three-Year European Investor Warrant") to same or other investor(s)

Issue price paid by investors(s) for Warrant may equal purchase price paid by issuer for Put During term of Put, Issuer may pay a contract adjustment payment (e.g., fixed quarterly cash payment)

During term of Debt, Issuer may pay a coupon (e.g., quarterly cash coupon), which has an initial fixed level Sum of fixed payment on Put and initial fixed coupon on Debt is defined as Fixed Total Payment Recollaterizable Three-Year American Issuer Put Maturity is three years Before maturity Issuer may have the right (e.g., upon ninety days' notice) to put the maximum number of shares, for cash equal to principal of Debt, less sum of all remaining Fixed Total Payments through maturity of Put At maturity, Issuer may have right to put a capped variable number of shares to investor(s), for cash equal to principal of Debt Debt may initially be pledged as collateral to secure investors' obligations under the Put Investor(s) may have right to recollateralize Put with Treasury Bills equal to principal of Debt Resettable Remarketable Five-Year Debt Initial maturity is five years Initial coupon is fixed (e.g., quarterly cash coupon)

Either upon Issuer notice of exercise of Put prior to 2.75 years (for example), or automatically at end of 2.75 years (for example):

The remaining maturity of the Debt may be reset (e.g., to 2.25 years)

The interest rate may be reset so that the Debt can be sold for a certain percentage (e.g., 100.5%) of purchase price of treasury portfolio which defeases exercise price of Put and remaining Total Payments through exercise date The Debt may be remarketed to new investors Separable Net-Share-Settled Three-Year European Investor Warrant Maturity is three years Warrant may be exercisable only at maturity Warrant may entitle investor(s) to a number of shares equal to: (issue price /warrant strike price)*(stock price−warrant strike price)/stock price Warrant may be immediately separable from Debt and from Put Referring now to a specific example of the SPACES-type embodiment discussed above, such SPACES structure may have the following characteristics (the specific dates, time periods, interest rates and the like are, of course, provided simply as examples which are intended to be illustrative and not restrictive):

Illustrative Terms

Stock Price At Issuance: Any desired amount (e.g., $100)

Total Issue Price: Any desired amount (e.g., $100)

Fixed Total Payments: Any desired amount (e.g., 7.5% per annum)

Debt Terms

Principal Amount: Any desired amount (e.g., $100)

Issue Price: Any desired amount (e.g., $100)

Maturity: Any desired time (e.g., 5 years)

Cash Coupon: Any desired amount (e.g., 5% per annum (subject to reset))

Warrant Terms

Warrant Strike Price: Any desired amount (e.g., $120)

Price Paid By Investors: Any desired amount (e.g., $15)

Maturity: Any desired time (e.g., 3 years)

Put Terms

Put Strike Price: Any desired amount (e.g., $100)

Price Paid By Issuer: Any desired amount (e.g., $15)

Maturity: Any desired time (e.g., 3 years)
Contract Payment: Any desired amount (e.g., 2.5% per annum)
At End of 3 Years (Maturity)
Note: Issuer may have the right to exercise Put prior to maturity. For the purposes of this example, however, it is assumed that issuer does not exercise Put until maturity.
Case 1:
Stock Price≦$100
Assumed Stock Price: $90
Total Shares Received by Investors=1 share
Warrant: Investors don't exercise Warrant
Put: Number of Shares Put by Issuer=1 share
Case 2
$100≦Stock Price≦$120
Assumed Stock Price: $110
Total Shares Received by Investors=0.9091 shares
Warrant: Investors don't exercise Warrant
Put: Number of Shares Put by Issuer=0.9091 shares
Case 3
Stock Price≧$120
Assumed Stock Price: $130
Total Shares Received by Investors=0.8333 shares
Warrant: Number of Shares Received by Investors=0.0641 shares
Put: Number of Shares Put by Issuer=0.7692 shares In another embodiment, a net accretion may result from a purchased variable share repurchase contract (e.g., for a low P/E issuer).

In another embodiment, one or more instruments (e.g., debt, forward contract) may be sold as a unit.

In additional embodiments: (a) the PACES may be stripped (e.g., by an investor) into components and formed to trade separately; (b) the SPACES may be formed of PACES plus a call spread purchased by the issuer (which call spread may be structured as a pre-paid variable-share forward; (c) the SPACES may be backed by one or more assets; (d) the OUTER SPACES may be formed of PACES plus a put spread sold by the issuer (which put spread may be structured as a pre-paid variable-share forward); and/or (e) the COMMON SPACES may be formed of common stock (or any equity) plus a call spread purchased by the issuer (which call spread may be structured as a pre-paid variable-share forward).

Of note, the method embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the various steps may be performed in any desired order. Further still, the invention may be used in the context of one or more issuers and/or one or more investors. Further still, the first entity may comprise one or more issuing companies and the second entity may comprise one or more investors.

What is claimed is:

1. A method implemented by a programmed computer system for use in connection with the sale of stock by a first entity, which method comprises the steps of:

inputting data regarding the sale, by the first entity to a second entity, of a security consisting of: (i) a post-paid forward contract which obligates the second entity to purchase a fixed number of shares stock of the first entity; and (ii) debt;

inputting data regarding the purchase, by the first entity from the second entity, of a pre-paid forward contract which obligates the second entity to deliver to the first entity a variable number of shares of stock in the first entity;

inputting a then-current stock price associated with the stock of the first entity;

calculating via the programmed computer system a number of shares underlying the pre-paid forward contract, based on a formula that is a function of the then-current stock price and a remaining maturity associated with the pre-paid forward contract;

recording the data regarding the sale, by the first entity to the second entity, of the security consisting of: (i) the post-paid forward contract; and (ii) the debt;

recording the data regarding the purchase, by the first entity from the second entity, of the pre-paid forward contract; and recording the calculated number of shares underlying the pre-paid forward contract.

* * * * *